July 10, 1956  W. S. TOUCHMAN  2,753,765
FABRICATING MECHANISM

Filed Sept. 12, 1952  11 Sheets-Sheet 1

INVENTOR.
WILLIAM S. TOUCHMAN
BY
Marechal Biebel French & Bugg
ATTORNEYS

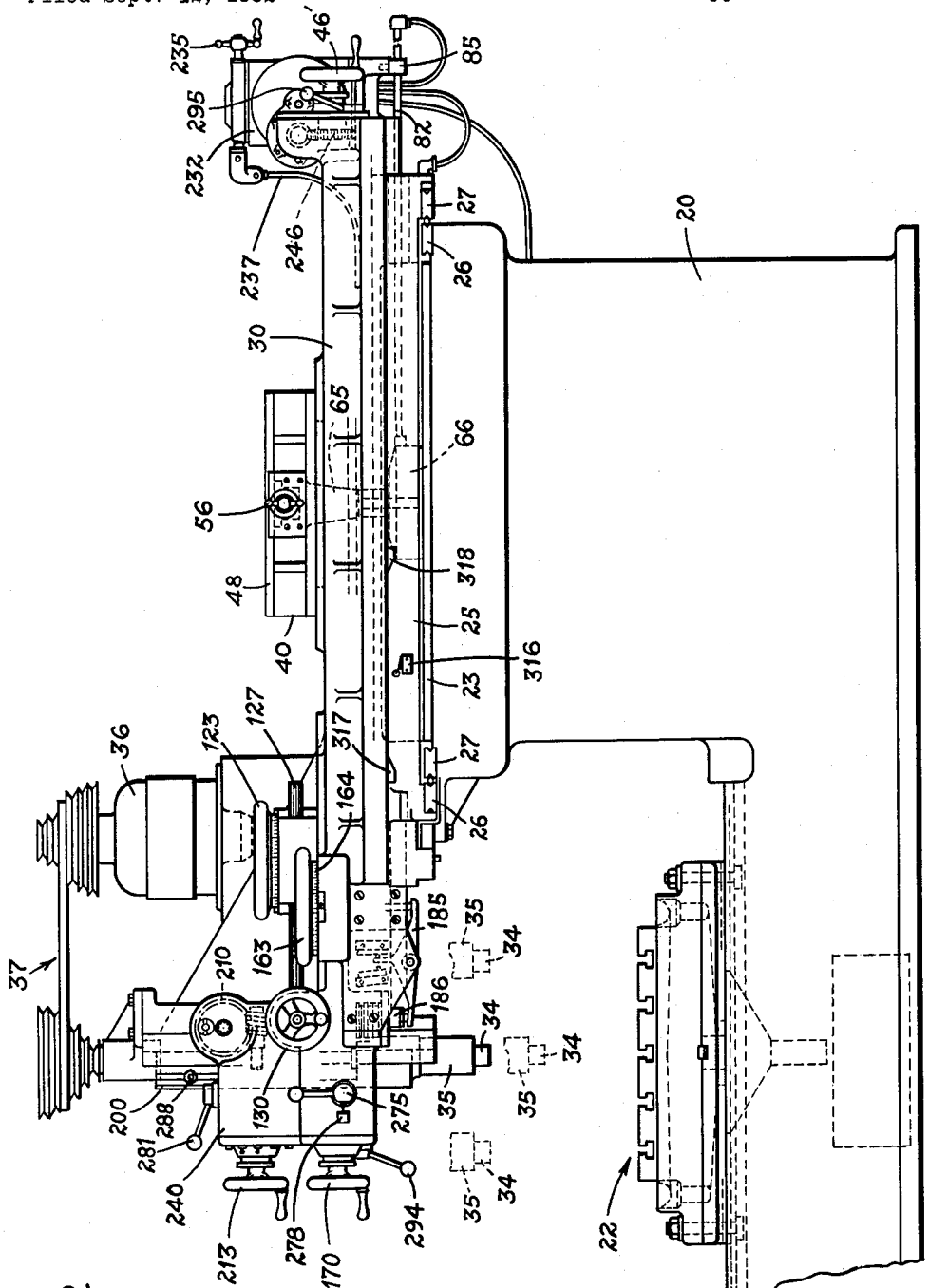

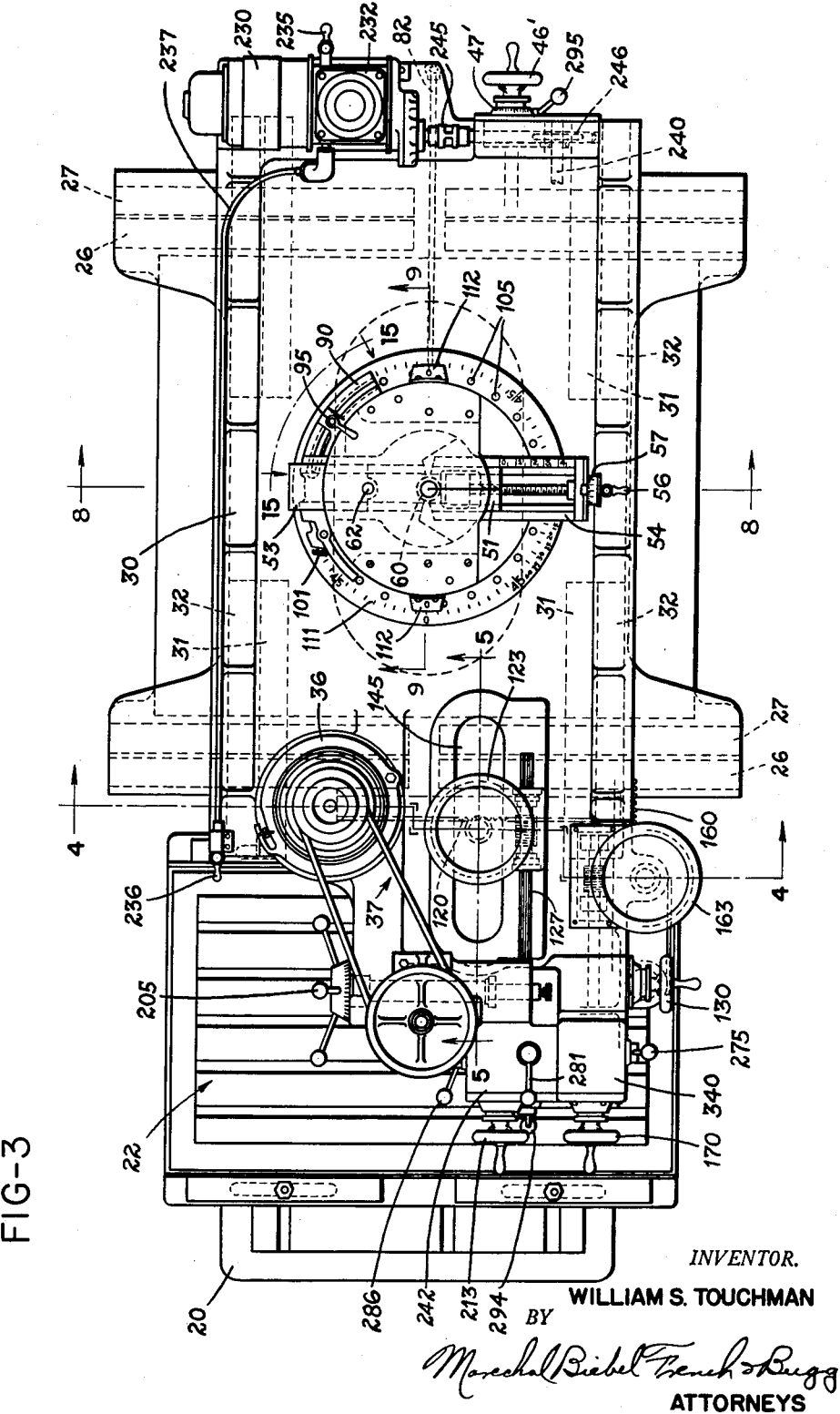

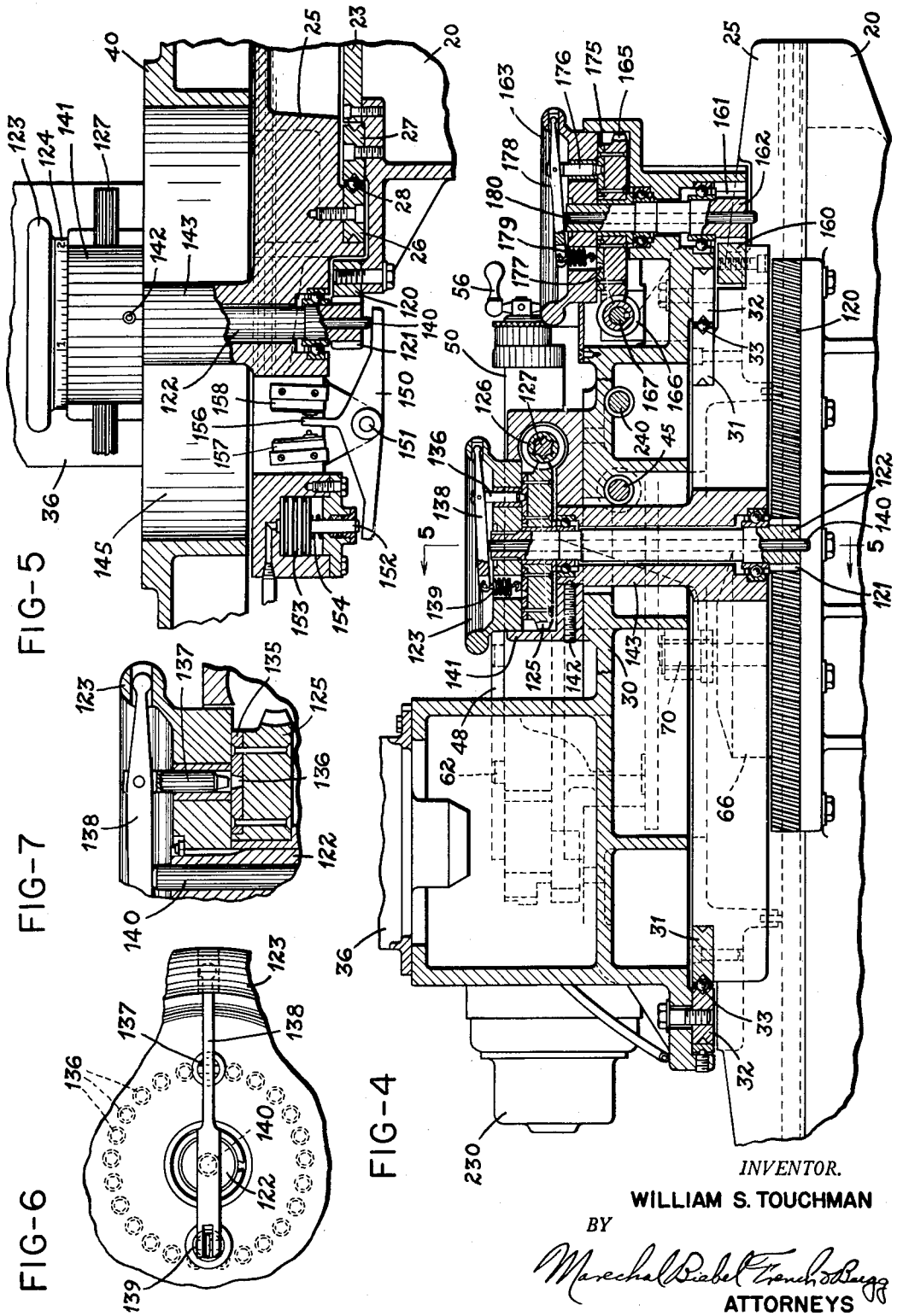

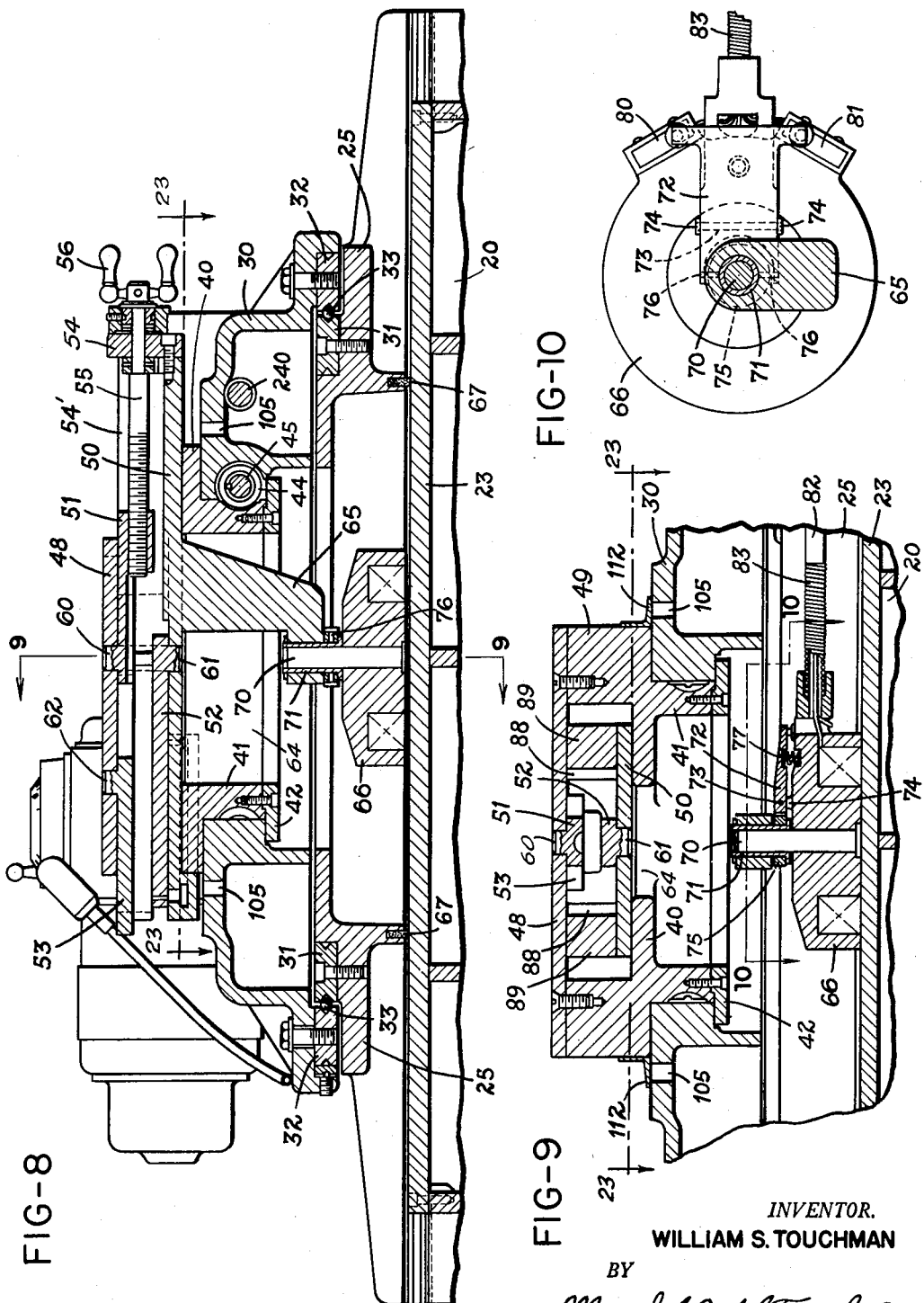

July 10, 1956 W. S. TOUCHMAN 2,753,765
FABRICATING MECHANISM
Filed Sept. 12, 1952 11 Sheets-Sheet 6
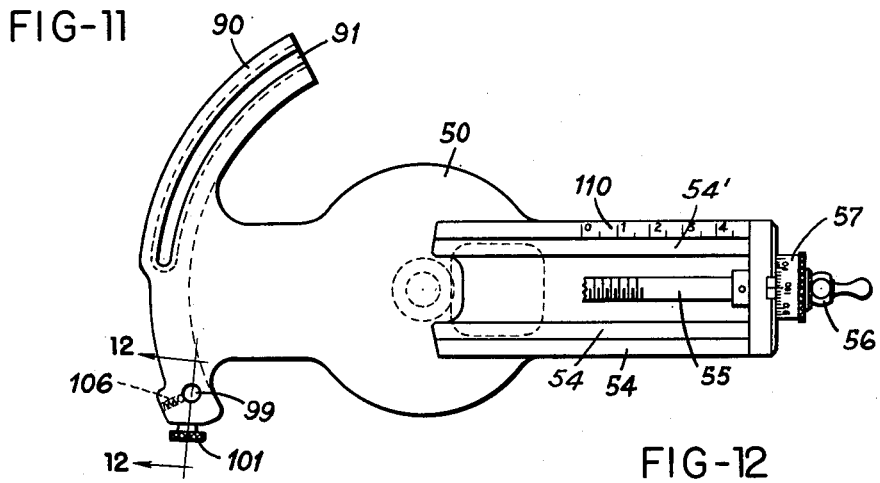
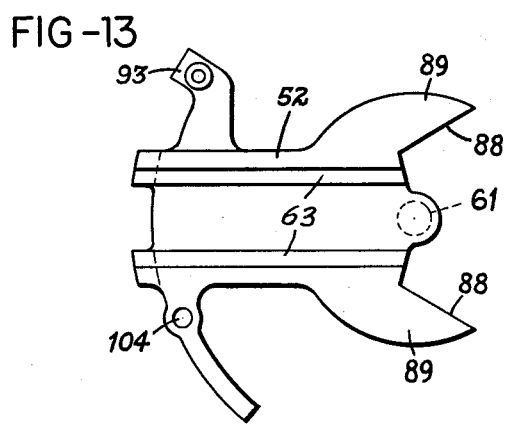
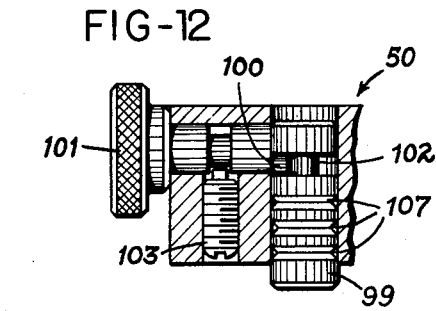
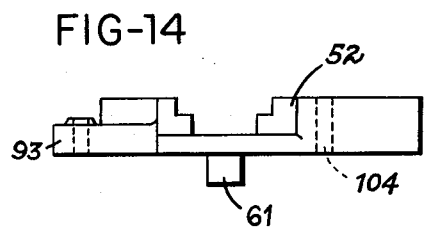
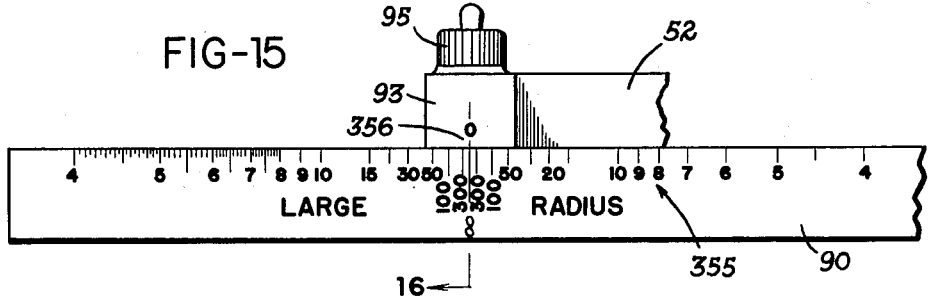
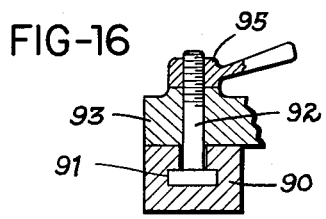
*INVENTOR.*
WILLIAM S. TOUCHMAN
BY
*Morechal Biebel French & Bugg*
ATTORNEYS

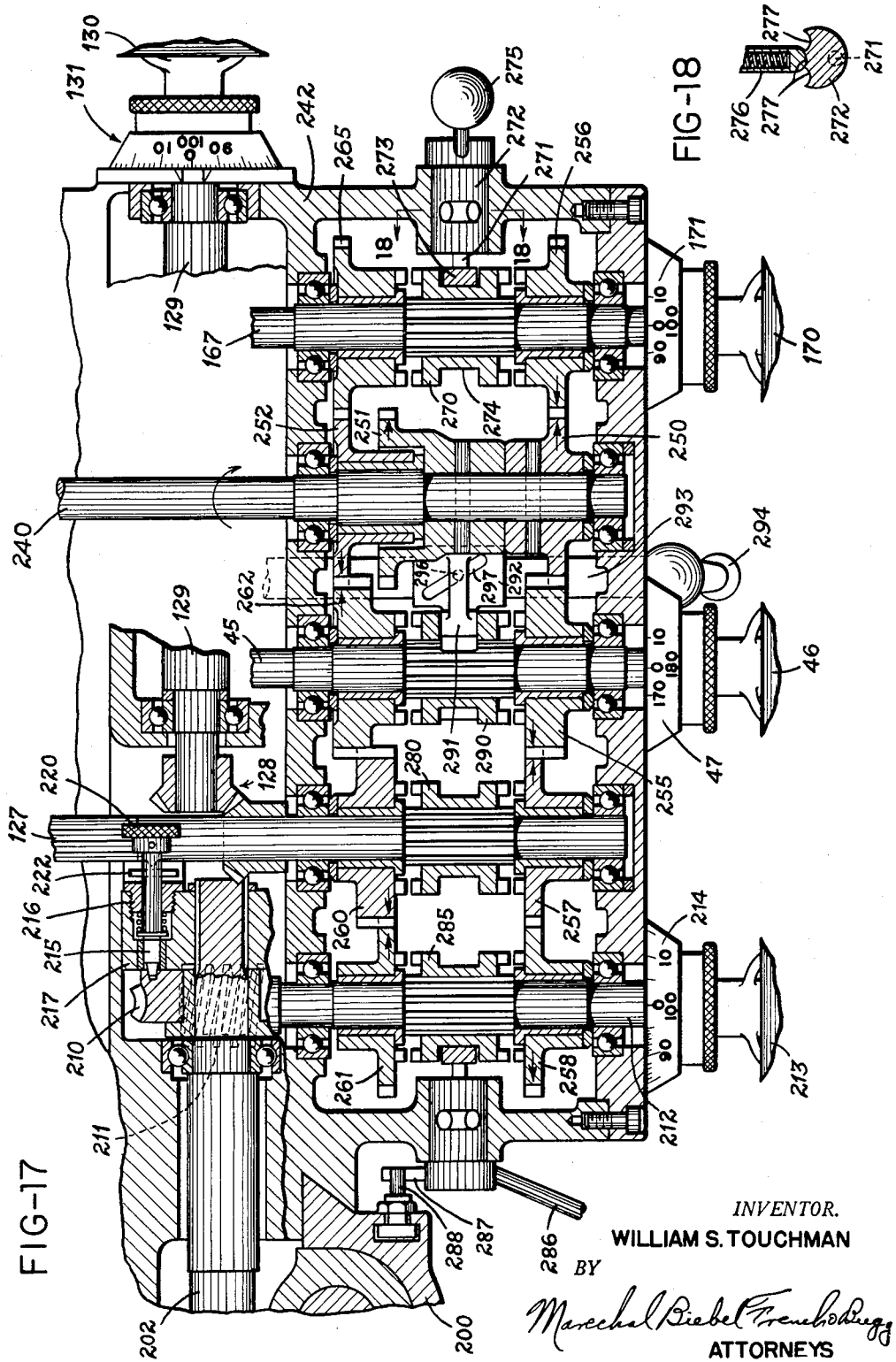

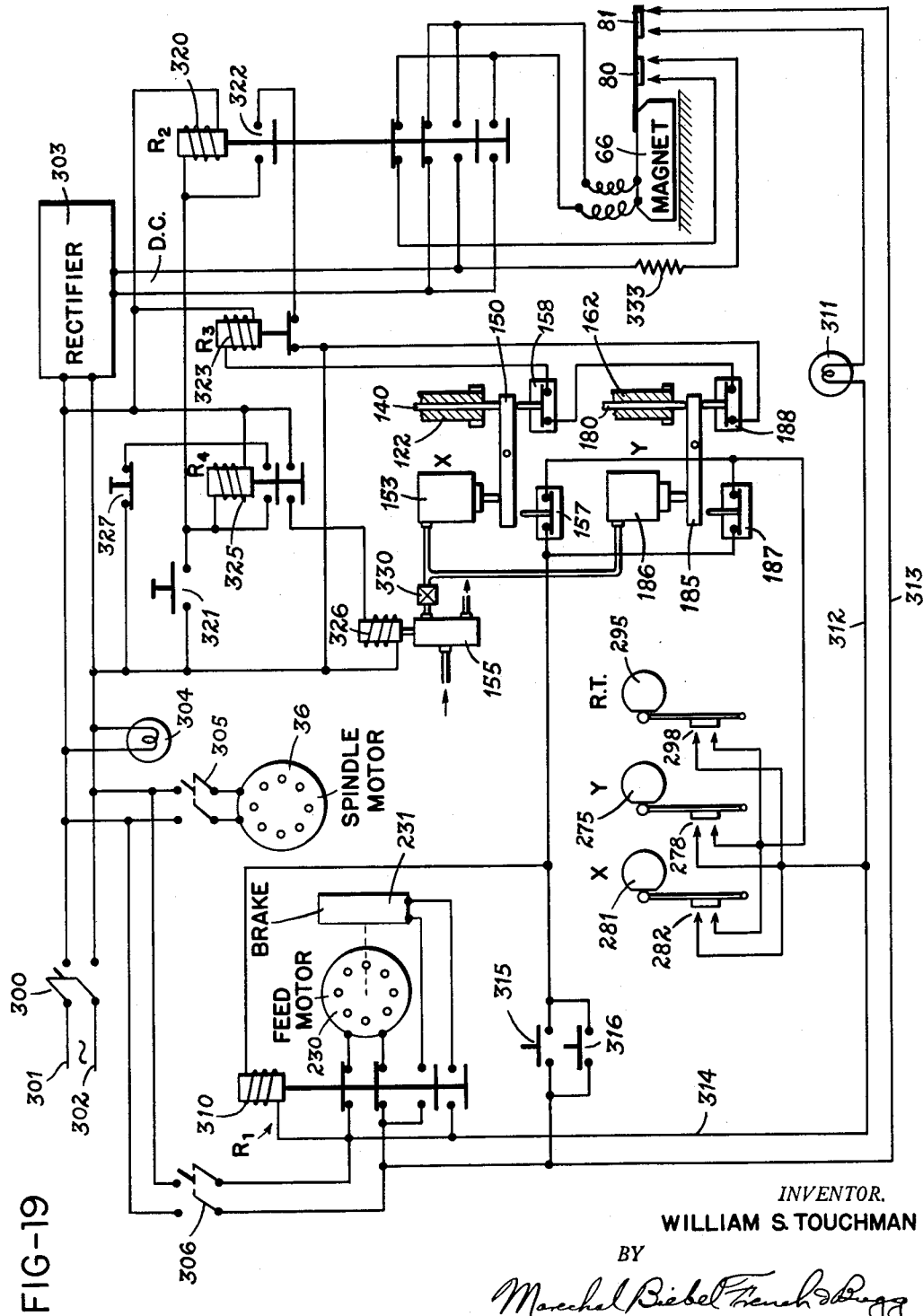

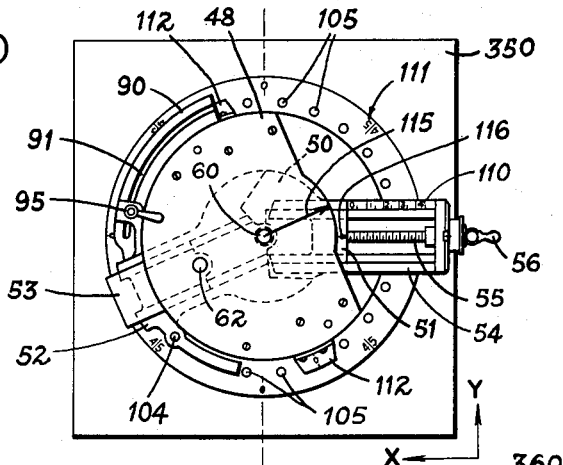
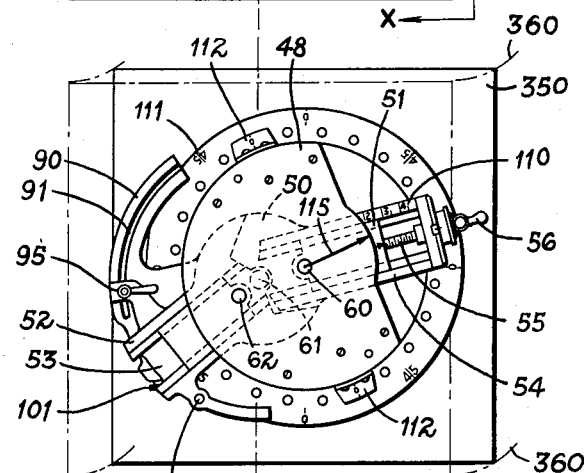
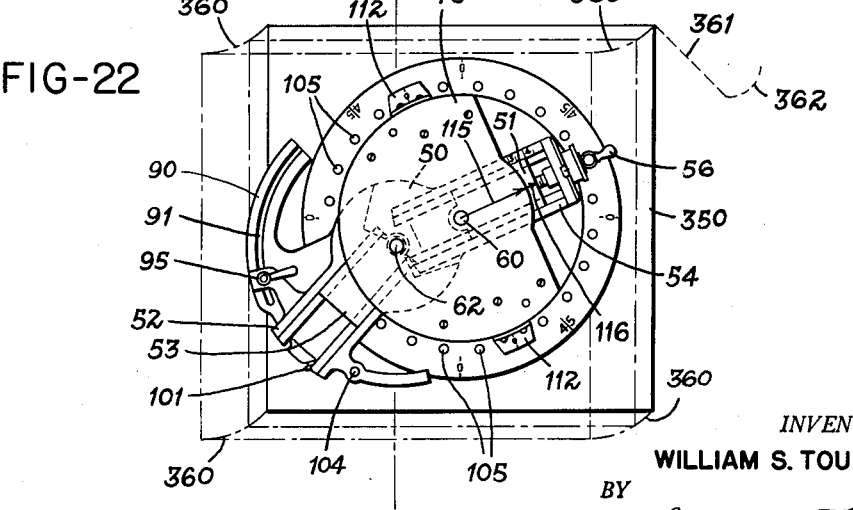

July 10, 1956 W. S. TOUCHMAN 2,753,765
FABRICATING MECHANISM
Filed Sept. 12, 1952 11 Sheets-Sheet 10

*INVENTOR.*
WILLIAM S. TOUCHMAN
BY
Marschal, Biebel, French & Bugg
ATTORNEYS

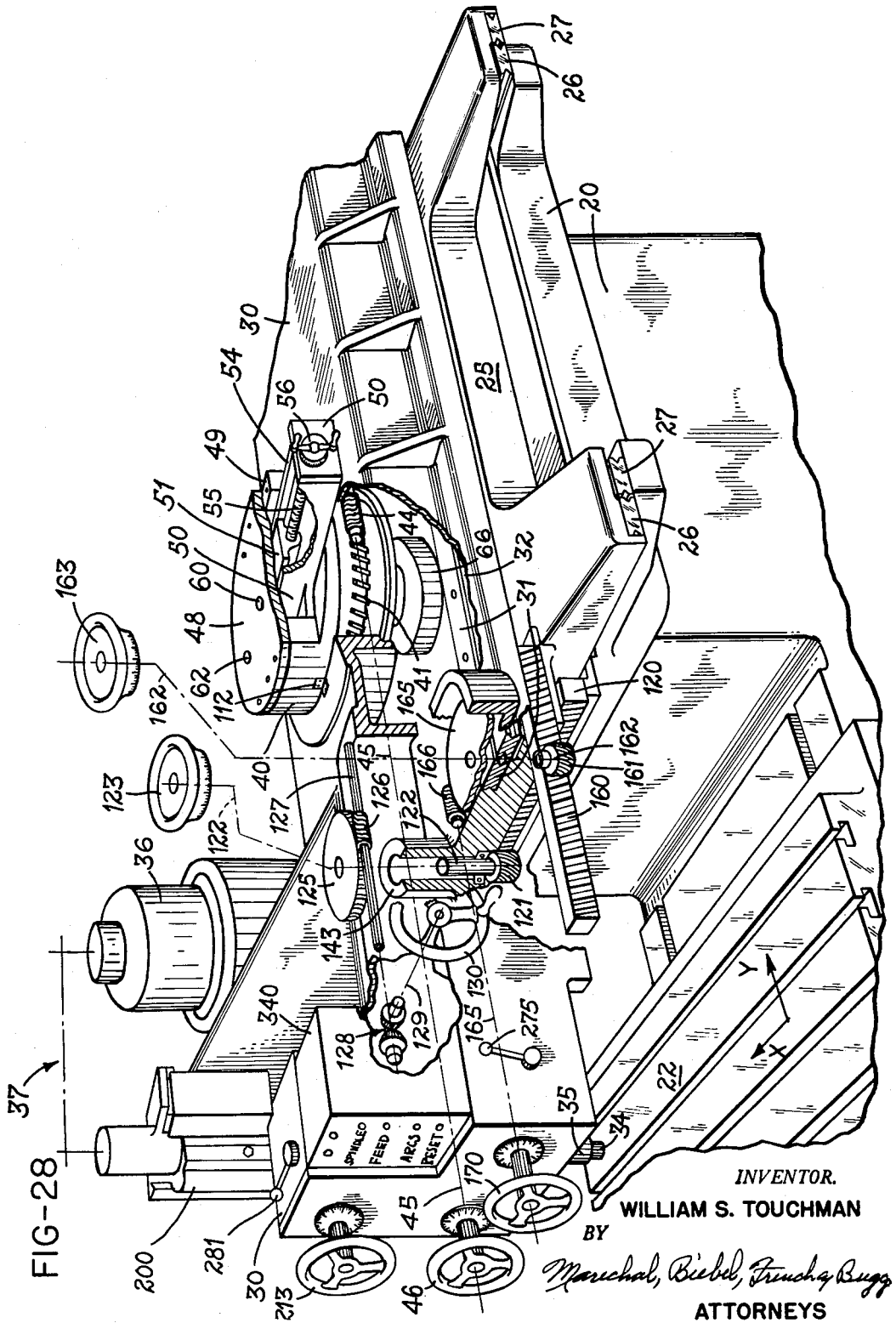

United States Patent Office 2,753,765
Patented July 10, 1956

2,753,765

FABRICATING MECHANISM

William S. Touchman, Clifton, Ohio

Application September 12, 1952, Serial No. 316,380

14 Claims. (Cl. 90—15)

This invention relates to apparatus for generating profiles, surfaces and shapes and is adapted for use with or incorporation in machines wherein a working member and a workpiece are caused to have relative movement to carry out a working operation.

The invention has special relation to apparatus of the character disclosed in my copending application Serial No. 724,796 filed January 28, 1947, now Patent No. 2,610,550 issued September 16, 1952, for generating accurately controlled relative movement of a working member and workpiece along an arcuate course of any radius from zero to infinity and including a continuous course composed of arcs of different radii over the complete range from zero to infinity without the use of a template or like guiding member and without withdrawing the tool from the work.

It is a major object of the present invention to provide apparatus of the above general character which is of simple construction capable of ready manufacture in different sizes for correspondingly varied work operations, which includes a minimum number of moving parts while retaining freedom of relative movement for the working member and workpiece through arcs of any radius over the complete range from zero to infinity, and which is of rugged construction assuring efficient operation with minimum maintenance requirements.

Another object is to provide such apparatus in which all controls for the movements of the working member with respect to the workpiece are arranged at readily accessible locations for ready manual operation of the apparatus by means of handwheels and like manual controls.

An additional object is to provide such apparatus in which the drives and controls are so constructed and arranged that all working movements of the apparatus through arcs of the entire range of radii from zero to infinity may be generated by selected actuation of a single pair of controls, thereby facilitating operation of the apparatus as well as accurate measurement of its working movements.

A further object of the invention is to provide such apparatus in which operation is facilitated by the incorporation of an additional pair of manual controls for effecting movement of the working member with respect to the workpiece along straight lines respectively parallel and perpendicular to predetermined index directions such as the sides of the work table and operative also in response to movements of the working member in other directions to indicate at all times the position of the working member with respect to such index directions.

It is also an object of the invention to provide apparatus as outlined above which incorporates a power drive for some or all of the working movements of the working member with respect to the workpiece, and which at the same time can if desired be operated by manual control while still affording the same complete range of arcuate movement under both power and manual operation.

Many other objects and advantages will be apparent from the following description, the accompanying drawings and the appended claims.

In the drawings—

Figs. 1, 2 and 3 are respectively front, side and top views of a machine tool constructed in accordance with the present invention;

Fig. 4 is a fragmentary section on the line 4—4 of Fig. 3;

Fig. 5 is a fragmentary section on the line 5—5 of Fig. 3 and also of Fig. 4;

Fig. 6 is a fragmentary view looking downwardly in Fig. 5;

Fig. 7 is an enlarged fragment of Fig. 4;

Fig. 8 is a section on the line 8—8 of Fig. 3;

Fig. 9 is a fragmentary section on the line 9—9 of Fig. 3 and also of Fig. 8;

Fig. 10 is a fragmentary view looking downwardly as indicated by the line 10—10 in Fig. 9 and on a larger scale;

Fig. 11 is a detail top view of the center pivot block guide in the infinity radius mechanism;

Fig. 12 is an enlarged fragmentary section on the line 12—12 of Fig. 11;

Fig. 13 is a detail top view of the offset pivot block guide;

Fig. 14 is a detail view looking from left to right in Fig. 13;

Fig. 15 is a detail view looking in the direction indicated by the line 15—15 in Fig. 3;

Fig. 16 is a fragmentary section on the line 16—16 of Fig. 15;

Fig. 17 is a developed view illustrating schematically the gearing arrangement for power operation of the machine tool, as indicated by the line 17—17 in Fig. 1;

Fig. 18 is a fragmentary section taken approximately as indicated by the line 18—18 of Fig. 17;

Fig. 19 is a wiring diagram;

Figs. 20 to 22 are consecutive views illustrating the operation of certain parts of the machine in generating an arc of large radius;

Fig. 28 is a somewhat diagrammatic view in the nature of a perspective showing the apparatus of Figs. 1–3 with portions broken away to illustrate the relative movements of the parts in conjunction with the drive mechanism.

Figure 1:
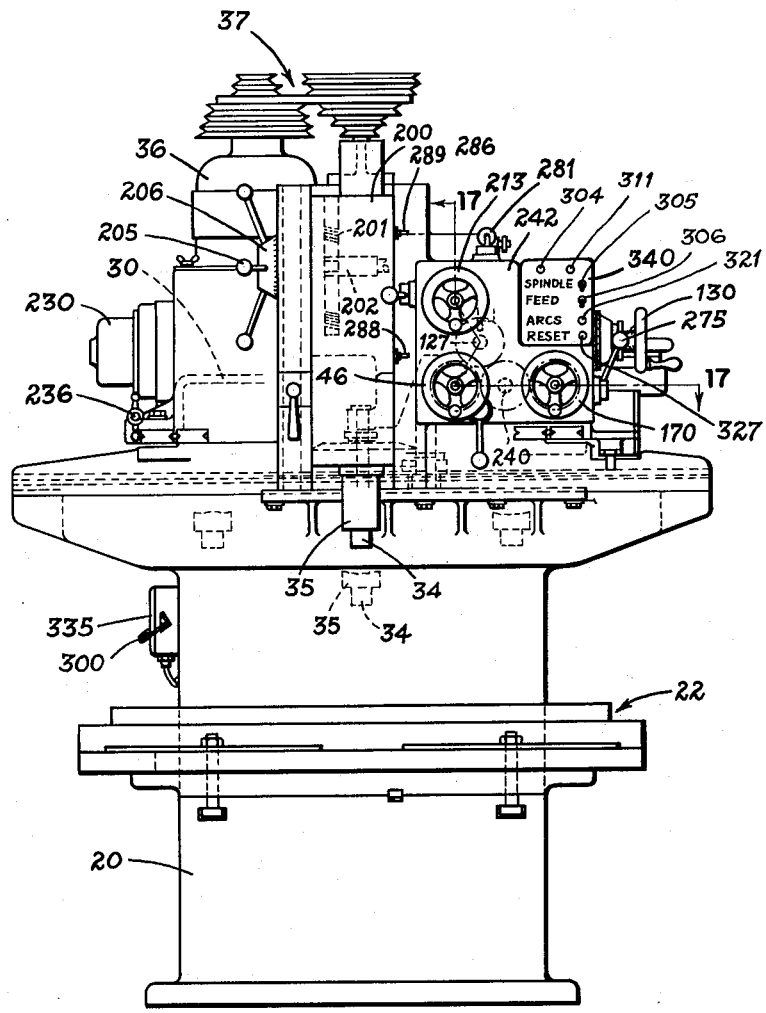

The preferred embodiment of the invention shown in the drawings is a milling machine in which the workpiece is adapted to be mounted on a normally stationary work table on the main base of the machine. The tool and substantially all of the working parts and controls are carried by a ram mounted for translational movement with respect to the base and work table, and the mounting for the ram comprises primarily a frame or saddle connected with the ram and the base for straight line movement in single directions perpendicular to each other. A rotary table is mounted for rotation within the ram and in turn supports a pair of pivot blocks and associated pivot block guides forming the sub-assembly which is referred to herein as the infinity radius mechanism and which cooperates with the rotary table to guide and control the working movements of the ram. The infinity radius mechanism also includes a magnet operable to clamp one part of the mechanism to the base of the machine in order to serve as a focal point with respect to which the work movements of the ram are caused to take place. This magnet is releasable as required for resetting of the machine between working strokes.

The infinity radius mechanism is employed for originating all arcuate movements of the ram and may also be similarly used for all linear movements of the ram. However, the invention provides additional alternative drives for movements of the ram in relatively perpedicular index directions parallel to the sides of the work table which are termed the X- and Y-directions and run respectively longitudinally and transversely of the work table. The infinity radius mechanism is used for all other linear motions, i. e., in directions oblique with respect to the index directions, and the alternative or X- and Y-drives function during operation of the infinity radius mechanism to indicate the position of the working member with respect to the corresponding X- and Y-axes of the work table.

The infinity radius mechanism operates differently depending upon whether the radius of the arc to be generated is greater or less than an established distance, which may for convenience be referred to as the overlap radius. Thus arcs of small radius, i. e., radii not greater than the overlap radius, are generated by rotation of the rotary table following adjustment of the infinity radius mechanism to establish the proper radius. Arcs of large radius, namely from the overlap radius up to infinity, are generated by first adjusting the guide members in the infinity radius mechanism to a predetermined angle directly related to the radius of the arc to be generated, and thereafter the machine is operated in the manner normally employed for linear motion but is caused by the action of the adjusted guides to follow the desired arcuate path. The geometric principles of this mechanism are discussed in detail in my above noted copending application, and further elaboration thereof is accordingly believed to be unnecessary.

This machine is operable as noted to execute multiple working strokes in such manner as to reproduce a continuous profile or other course composed of sections of straight lines and arcs of any radius arranged in any combination, the only practical limitation being the physical dimensions of the machine, and all such operations can be carried out without the use of a template or like guiding member and also without unproductive movements of the working member and workpiece. In order to accomplish this result, the invention provides selectively operable clamping means such that the working member and workpiece may be locked in fixed relation following completion of each section of the profile, and the infinity radius mechanism may then be reset to the proper position to generate the next section of the profile. This procedure may be repeated unitl the entire profile is completed, and both convenience and accuracy are thus assured.

In the drawings, the main base 20 of the machine includes a front portion to which is bolted or otherwise secured the usual work holding table 22. The raised back portion of the base supports the working parts of the machine in overhanging relation with work table 22 and includes a base plate 23 of magnetic material. A frame or saddle 25 is mounted for lateral sliding movement on base 20 by means of cooperating ways 26 and 27 and balls 28. A ram 30 is in turn mounted on saddle 25 with sliding movement from front to back with respect to the base, by means of similar ways 31 and 32 and balls 33, and the ram 30 is thus mounted in cooperation with saddle 25 for translational movement with respect to base 20. The ram supports all the major working parts of the machine, including the tool for working on the workpiece carried by table 22. For example, the ram is shown as carrying a spindle 34 which is mounted in a vertically adjustable quill 35 and is driven by a motor 36 mounted on the ram and connected with the spindle through means such as the belt drive indicated generally at 37, and since the ram moves translationally, if additional spindles are provided, each will follow an identical pattern.

Within the ram 30 is mounted a rotary table 40, which rests on the ram and includes a cylindrical worm wheel portion 41 extending into the ram. The rotary table 40 and ram 30 are held firmly together by means of a bearing ring 42 bolted to the lower end of wheel 41, the contacting surfaces of ram 30 and of the table 40 and ring 42 being ground smooth to form bearing surfaces. Relative rotational movement of table 40 and ram 30 is effected by means of teeth on worm wheel 41 meshing with a worm 44 on an elongated shaft 45 extending to the front of the ram and provided with a handwheel 46 and a vernier scale dial 47 shown as graduated in minutes. The shaft 45 extends also to the back end of the ram and is shown as provided with a second handwheel 46' and scale 47' for the convenience of the operator.

The rotary table 40 forms the housing for the infinity radius mechanism, which is supported in the upper part of table 40 and is enclosed by a top plate 48 bolted to the upwardly projecting boss portions 49 of table 40 as shown in Fig. 9. The infinity radius mechanism comprises four main parts, the center pivot block guide 50, the center pivot block 51, the offset pivot block guide 52, and the offset pivot block 53. The pivot block guides are shown in detail in Figs. 11–15, and the pivot blocks are shown in Figs. 24–27.

Figure 27:
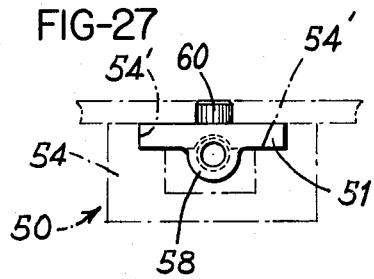
Fig. 27 is a view looking from left to right in Fig. 26 with portions of the center pivot block guide shown in broken lines.

The center pivot block guide 50 rests on the upper surface of the rotary table 40 for sliding movement thereon, and an extension portion 54 of guide 50 includes track portions 54' which receive and guide the opposite side portions of the pivot block 51 as best seen in Fig. 27. A lead screw 55 is journaled in the outer end of portion 54 and is provided at its outer end with a handle 56 and a vernier dial scale 57 graduated in thousandths of an inch. The lead screw 55 is threaded through a depending boss 58 on the pivot block 51, and block 51 also includes a pivot stud 60 which is journaled in top plate 48 on the central axis of the rotary table 40.

The offset pivot block guide 52 rests slidably on top of the guide 50 and includes a depending pivot stud 61 which is journaled in the guide 50 coaxially with the magnet supporting shaft 70. Track portions 63 on guide 52 correspond to tracks 54' on guide 50 and similarly receive and guide the opposite side portions of the offset pivot block 53 as shown in Fig. 9. The block 53 includes a pivot stud 62 which is journaled in the top plate 48 in offset relation with pivot stud 60 as shown in Fig. 8, and the top plate 48 thus acts as a retainer for holding the guide 50 and the parts 51—53 on the rotary table 40 while providing for sliding lateral movement of guide 50 with respect to table 40.

Means are provided for releasably clamping the center pivot block guide 50 in fixed relation with the main base 20. Referring to Figs. 8–10 and 23, the rotary table 40 has an open central portion forming a slot 64, and the guide 50 includes an arm 65 which extends downwardly through this slot 64 and carries an electromagnet 66 adapted for releasable magnetic clamping to the base plate 23. Felt or like wiping or sealing members 67 are carried by saddle 25 for engagement with the upper surface of base plate 23 to keep it free from dirt, and the magnet is thus entirely enclosed and protected against dirt, metal chips and the like.

The magnet 66 includes a shaft 70 slidable in a bushing 71 carried by the arm 65, and an arm 72 is pivoted at 73 in ears 74 on the upper surface of the magnet. One end of arm 72 is forked to enclose a collar 75 on bushing 71, and arm 72 and collar 75 are pivoted together at 76. A compression spring 77 is mounted between the magnet 66 and the opposite end of arm 72, and when the magnet is deenergized, the spring 77 urges the adjacent portions of the magnet and arm 72 apart and thus acts through the pivots 73 and 76 to raise the magnet out of contact with base plate 23.

The arm 72 also acts to operate a pair of switches 80 and 81 mounted on the magnet 66 and described hereinafter in connection with the wiring diagram. These switches are normally open in the raised position of the magnet by reason of the relative separation of the free end of arm 72 and the magnet. When however the magnet is energized and moved downwardly, it pulls arm 72 downwardly about its pivot 76 and against spring 77, thus forcing the arm against the operating buttons of the switches. The leads to magnet 66 and switches 80 and 81 are carried in a pipe 82 having one end fastened to a spring portion 83 rigidly connected to magnet 66. The other end of pipe 82 slides in a block 85 (Fig. 2) pivoted on a vertical axis at the back end of the ram. The pipe 82 and spring 83 thus support the necessary wires to the magnet and also serves to limit pivotal movement of the magnet which might otherwise tend to twist these wires during resetting.

The pivotal connection 61 between the two pivot block guides 50 and 52 provides for relative angular movement of these parts in either direction from their aligned position as shown in Fig. 3, with this movement being limited in each direction to a predetermined angle established by engagement of the sides of the portion 54 of guide 50 with the sides 88 of the wings 89 forming the adjacent open ended portion of guide 52. This maximum angle of adjustment of these parts is determined by the minimum large radius arc of movement desired for ram 30, as described hereinafter.

Means are provided for releasably clamping the two guides together in a selected position of angular adjustment. As shown in Figs. 11 and 16, the guide 50 includes an arcuate portion 90 having a T-slot 91 therein which receives the head of a clamp bolt 92 carried by a projecting boss portion 93 of the guide 52 and provided with a clamping nut 95. The portion 90 of guide 50 is of sufficient length to provide for clamping the two guides together in any selected angular position within the range established by the parts 54 and 88 as described.

In addition to the clamping unit 90—95, means are provided for selectively locking the guide 50 to guide 52 or to the ram 30, and this locking means also has a neutral position. Referring to Figs. 11 and 12, a locking pin 99 is mounted in a bore extending through the guide 50 and is vertically shiftable in the bore by means of an eccentric pin 100 which projects from the inner end of a knob 101 into a circumferential groove 102 on pin 99, the knob 101 having a retaining screw 103. In the uppermost position of pin 99, it engages in a bore 104 in guide 52 to lock the two guides in their aligned position, and in its lower position, pin 99 is adapted to engage in one of a selected series of bores 105 arranged at convenient intervals in the adjacent upper surface of ram 30, for example, every 15°. Pin 99 may be yieldably held in its upper, lower, or neutral position by means such as the spring and ball detent indicated at 106 adapted to engage one of the respective circumferential grooves 107 in the pin.

The infinity radius mechanism as described determines both the length of a given arcuate movement of the ram and also the radius of the arc through which the ram moves, which may vary over the complete range of zero to infinity. Thus when the guides 50 and 52 are in their aligned position, the ram can be caused to move in a straight line (an arc of infinite radius) in any selected direction in a horizontal plane, or the ram can also be caused to move in a circular arc of short radius ranging from zero to the fixed maximum determined by the design and arrangement of the infinity radius mechanism as described hereinafter. When the guides 50 and 52 are adjusted angularly from their aligned position, they will cooperate with their respective pivot blocks to guide the ram through a circular arc of any selected radius from approximately infinity to the predetermined minimum which is similarly established by the design of the parts.

Fig. 3 shows the guides 50 and 52 in aligned position directed parallel to the T-slots in work table 22, which as noted is for convenience considered as the X-direction, and the Y-direction extends therefore transversely of the work table, as indicated by the arrows in Fig. 28. With the parts in these relative positions, the ram can be caused to move from left to right as viewed in Figs. 3 and 8 through a maximum distance in a single stroke determined by the length of the slot 64 in the rotary table with respect to the corresponding dimension of the depending arm 65 on the guide 50. It is convenient but not essential to design these parts in such manner as to establish this distance as equal to or slightly more than the relative spacing of the pivotal axes of pivot blocks 51 and 53, and it is shown as 4½ inches. In addition, provision may be made for overtravel at the opposite side of the centered or zero position of guide 50 and table 40 by increasing the clearances of guide 50 with respect to the rotary table, which may be helpful for burr removal and the like.

Operation of the machine to produce this linear motion of the ram is effected by rotation of the hand wheel 56 after the guide 50 is clamped to the base by energizing the magnet 66. Under these conditions, the guides 50 and 52 will be stationary, and rotation of the lead screw 55 will therefore cause linear movement of the pivot block 51 with respect to guide 50. Since block 51 is connected by the pivot stud 60 to the top plate 48, and since top plate 48 is part of the rotary table which is itself carried by the ram 30, this movement of pivot block 51 will cause similar movement of the ram with respect to guides 50 and therefore with respect to base 20. The pivot block 53 will at the same time be carried forward in guided relation with the guide 52 by the connection between its pivot stud 62 and the top plate 48 to maintain the movement of the ram in a straight line. During this movement, the clamped connection between the guide 50 and the base is centered on the magnet shaft 70, and the movement of the ram will accordingly be with respect to the axis of magnet 66 and shaft 70. The extent of this linear motion is measured by the scale dial 57, and a coarse scale 110 is also provided on guide 50 which registers with the outer end of pivot block 51. For making a straight line movement greater than is permitted in a single stroke of the lead screw, it is merely necessary to reset by releasing magnet 66, rotating handle 56 back to its starting position, which causes the guide 50 to move back to its zero position with relation to table 40 without movement of the ram, and then again driving by means of lead screw 55 after the magnet is reclamped.

The angular direction of this linear motion of the ram may be selected as desired by initial adjustment of table 40 to align the guides in the desired direction, which is effected through operation of the worm 44 by handwheel 46 as described. Additional measurement of the angular position of the rotary table is provided by the scale 111 on the upper surface of the ram, which may be read in conjunction with the pair of pointers 112 mounted at opposite sides of the rotary table. A large arrow 115 is shown on top plate 48 at right angles to pointers 112, and a small arrow 116 is shown on the top of pivot block 51 directly above the axis of screw 55.

The infinity radius mechanism may be employed as described for all straight line movements of the ram and must be so employed for such oblique movements in directions other than the X- or Y-direction, but separate drives are provided for convenience in moving the ram in either of the X- and Y-directions. Referring to Figs. 4–6, the X-drive moves the saddle 25 and the ram with respect to base and the work table 22 and includes a rack 120 mounted on the base 20 and meshing with a pinion 121 on a hollow vertical shaft 122 journaled in the saddle 25 and provided with a handwheel 123 at its upper end having a scale 124 thereon graduated in inches. A worm gear 125 is mounted for free rotation on shaft 122, and gear 125 meshes with a worm 126 splined on a shaft 127 having a beveled gear connection 128 (Fig. 17) with a shaft 129 which extends to the right hand side of the machine and is provided with a handwheel 130 and vernier scale dial 131 graduated in thousandths of an inch.

The worm gear 125 has a releasable clutch connection with the handwheel 123. A plate 135 is riveted to the upper surface of gear 125 and is provided with a plurality of tapered bores 136 at its upper surface adapted to receive the tapered lower end of a locking pin 137 pivoted on a lever 138 which is in turn pivoted at one end in handwheel 123. A spring 139 normally urges lever 138 in the direction to cause engagement of the pin 137 in one of the holes 136 in the plate 135. Shaft 122 may accordingly be driven rapidly by means of handwheel 123, as may be desired for setting up operations, or more slowly and accurately, by means of handwheel 130.

It is necessary to provide positive assurance against movement of the ram in either of the X and Y-directions whenever magnet 66 is disengaged, in order to prevent an unintentional movement of the ram tending to reduce the accuracy of control. For the same reason, it is necessary to lock the ram against the movement in the X-direction when the Y-drive is in operation or vice versa. This desired locking action is shown as provided by employing a self-locking worm drive 125—126, and this arrangement has the advantage that it does not require release when it is desired to drive the ram in the X-direction, as would be the case if separate individually operable clamping means such as hand clamps or additional magnets similar to the magnet 66 were employed. With the worm drive 125—126 self-locking as described, provision is required for disengagement of the clutch connection between gear 125 and handwheel 123 when generating arcuate movements of the ram. This action is provided by a rod 140 and is movable upwardly within hollow shaft 122 to cause lever 138 to raise pin 136 out of locked relation with plate 135, and this worm and clutch assembly is enclosed within a housing 141 bolted at 142 to the boss portion 143 of the saddle which supports shaft 122 and extends through an enlarged slot 145 in the upper part of the ram.

Rod 140 is operated by a lever 150 pivoted to the ram at 151 and including one arm portion engaging the lower end of rod 140 and another arm portion adapted to be engaged by the piston rod 152 of a hydraulic cylinder 153 having a spring return 154 and actuated by a three-way valve such as the solenoid operated valve 155 shown in the wiring diagram (Fig. 18). Thus when pressure is applied in cylinder 153, lever 150 will be caused to move in counterclockwise direction as viewed in Fig. 5 and thus to raise rod 140 and disconnect the gear 125 as described. Lever 150 also includes an arm 156 arranged to operate selectively two limit switches 157 and 158 as described hereinafter in connection with the wiring diagram.

It will be apparent that when handwheel 130 is operated to move the ram in the X-direction, the dial 131 will accurately indicate the position of the ram along the X-axis of the work table, but for other movements of the ram, it is necessary as described to release the clutch connection to handwheel 130 by reason of the self-locking worm drive. However, the scale 124 on handwheel 123 will at all times provide a coarse measurement of the position of the ram with respect to the X-direction, and accurate measurement can be made whenever the ram is stationary by means of dial 131 as now described.

The bores 136 in plate 135 are shown as arranged in closely spaced relation around handwheel 123, and the spacing of these bores is correlated with the graduations on dial 131. For example, in a machine of the relative proportions indicated, the scale 124 is shown as measuring 5 inches of movement of the ram with respect to saddle 25 for each revolution of the handwheel 123, and if the dial 131 similarly moves the ram 0.10 inch for each revolution, there may be a total of 25 bores 136 uniformly spaced on handwheel 123, so that two revolutions of handwheel 130 are required to shift pin 137 from one of bores 136 to the next. This arrangement is employed for accurate measurement of the ram position by simply reading scale 124 to the nearest tenth of an inch with the pin 137 released, then rotating handwheel 130 through the distance required to engage pin 137 in one of the two nearest bores 136, and reading the movement on scale 131. The resulting smaller fraction of an inch is then added to or subtracted from the reading of scale 124 to give the desired accurate measurement.

The drive for causing movement of the ram in the Y-direction, by moving the ram with respect to the saddle in that direction, is similar to the X-drive as just described. Referring to Fig. 4, a rack 160 is bolted to the right hand side of saddle 25 and meshes with a pinion 161 on a hollow shaft 162 journaled in the ram and provided at its upper end with a handwheel 163 having a scale 164 thereon. A worm gear 165 is freely mounted on shaft 162 and meshes with a worm 166 on a shaft 167 which extends to the front of the machine and is provided with a handwheel 170 having a vernier scale dial 171. The gear 165 has a clutch connection with handwheel 163 similar to that already described in connection with the gear 125 and including a plate 175, pin 176, bores 177, lever 178, spring 179 and rod 180. The rod 180 is operated by a lever 185 (Figs. 2 and 18) similar to the lever 150 as described and similarly controlled by a hydraulic cylinder 186. The limit switches 187 and 188 correspond with the switches 157 and 158 and are similarly operated by the lever 185. It will accordingly be seen that rotation of the handwheel 170 will operate as described to cause the ram to move in the Y-direction with respect to saddle 25, and the handwheel 163 provides a convenient means for more rapid movement of the ram. The above discussion with respect to the self-locking worm drive and to movement of the ram along the X-direction apply also to the Y-direction.

In operating the machine to generate arcs of small radius, the lead screw 55 is first adjusted to the desired radius with magnet 66 released. For such small radius arcs, the radius of the arc is determined by the relative spacing of the central axis of rotary table 40 from the central axis of magnet 66 and its shaft 70. Then with the magnet clamped to base plate 23, the table 40 is rotated by operation of handwheel 46 or 46' and this motion will cause the ram to move translationally along the desired arcuate path.

Figure 23:
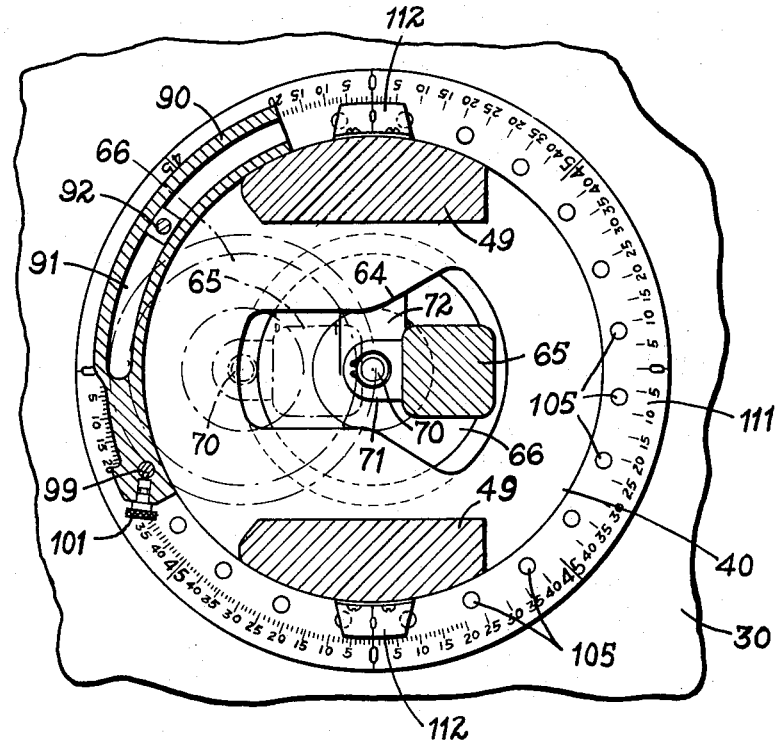
Fig. 23 is a fragmentary view taken approximately on the line 23—23 of Figs. 8 and 9 on a larger scale.
Figure 24:
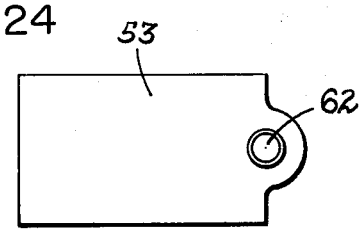
Fig. 24 is a detail plan view of the offset pivot block.
Figure 25:
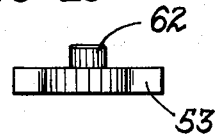
Fig. 25 is a detail view looking from right to left in Fig. 24.
Figure 26:
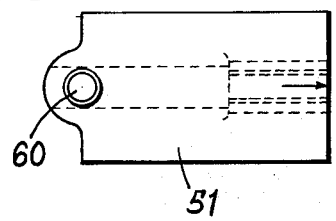
Fig. 26 is a detail plan view of the center pivot block.

Thus when the guide 50 is in its zero position, which is the position shown in Figs. 8 and 23 wherein the pivot stud 61 and the magnet shaft 70 are centered on the central axis of the rotary table 40, operation of the worm 44 will simply cause rotation of the rotary table, but there will be no movement of the ram. If, however, the lead screw 55 has been operated to move guide 50 from its zero position, for example a distance of 2 inches, then when the worm 44 is operated, the rotary table will be caused to swing about a radius centered on the magnet stud 70, and since the rotary table is journaled in the ram, the ram will similarly move translationally in such manner that every point thereon will follow an arc having a radius of 2 inches. Similar movements will occur for each other radius within the range of movement of the guide 50 as described above. During each such movement about arcs of short radius, there will be no movement of the parts 50—53 with respect to the rotary table 40, other than their relative movements during initial setting to the desired radius.

In all the working movements described above, maximum convenience is obtained if the position of the ram as a whole is directly referenced to the position of the tool in the spindle 34. In other words, the zero position of the ram on both the X- and Y-axes should establish a zero reference position for the tool so that the actual position of the tool at all times will be determined by reference to its movements with respect to the X- and Y-axes, and therefore the work need only to be accurately set on the work table 22 in accordance with this reference arrangement. The advantages of this system for establishing the direction and length of straight line movements will immediately be apparent, and this system also offers significant advantages in the generating of arcs of small radius.

Thus this system makes possible the generation of an arc of small radius by reference either to the center of the arc or to the tangent to the starting point of the arc. In the first case, setting of the machine requires that while the infinity radius mechanism is in its zero position, the ram be indexed to the center point of the arc as referenced by its X- and Y-axes positions, and the magnet 66 is then clamped in that position. The next step is to rotate the rotary table until the lead screw 55 extends in the direction of the radius to the starting point of the arc, and then after the lead screw 55 is operated to the extent necessary to establish the desired radius as described above, the machine is ready to generate the arc.

In generating an arc of small radius without reference to its center, the tool is indexed to its starting position, and the rotary table is adjusted until the pointers 112 point in the direction of a tangent to the starting point of the arc. The lead screw 55 is adjusted to establish the desired radius either before or after setting of the rotary table, and since this lead screw is inherently in line at the start of the stroke with the radius drawn to the starting point of the arc, the adjustment of the rotary table must be such that the lead screw will point in the direction of the center of the arc. In either case, when the machine is operated to generate a small radius arc, the angular extent of the arc is indicated by the scale 111 as well as the scale dial 47, and the direction in which the arc is generated is determined simply by the direction of rotation of the rotary table 40.

The maximum radius of arc which can be generated by rotation of table 40 as described is determined by the maximum straight line movement of the ram permitted by operation of the lead screw 55, and with the parts of the sizes indicated, this maximum radius will be 4½ inches measured from the zero position. Arcs of greater radius are generated by operation of the machine through lead screw 55 with the guides 50 and 52 adjusted to an angular position which is determined by the formula $$\operatorname{cosec} \alpha = 2r/k \qquad (1)$$

where $\alpha$ is the angle between the guide 52 and its position of alignment with guide 50, $r$ is the radius of the arc to be generated, and $k$ is a constant equal to the distance between the pivotal axes 60 and 61 of the pivot blocks 51 and 53.

If the value $k$ is chosen as a whole number, and it is shown as 4 inches, this formula may be revised to read $$\operatorname{cosec} \alpha = 2r/4 = r/2 \qquad (2)$$

which has the special advantage that the operator needs only to perform the simple division of the desired radius by two and then read the proper angle $\alpha$ in the cosecant tables available in common engineering handbooks. As pointed out above, the parts 54 and 88 cooperate to set a maximum angle which will establish the minimum large radius arc generated by the machine, and if this minimum radius is selected as 4 inches, $$\operatorname{cosec} \alpha = 4/2 = 2.000 \qquad (3)$$
$$\alpha = 30° \qquad (4)$$

The surfaces 88 of guide 52 are accordingly shown as formed at angles of 30° to the central plane of the guide to limit the angular adjustment of the two guides to a maximum of 30° in each direction, and it will then be seen that the overlap radius of the machine covers a range of 4 to 4½ inches. If therefore the guides are adjusted to their maximum extent and the lead screw 55 is operated, the ram will move translationally along an arc of a 4-inch radius, and this radius will increase as the angle $\alpha$ is decreased until when angle $\alpha$ is equal to zero, the movement of the ram will be along an arc of infinite radius, i. e., a straight line. The essential principles of this mode of operation are explained in detail in my above Patent No. 2,610,550, especially in connection with Figs. 19–21 thereof, and it is also described hereinafter with respect to generation of a specific arc of long radius in connection with Figs. 20–22.

It will be apparent that since the ram 30 carries quill 35 and spindle 34, the bit or other tool in the spindle will trace all movements of the ram on a workpiece supported by work table 22. This materially simplifies work operations as compared with machines wherein the work table moves with respect to the tool, since the operator can watch the tool reproduce a drawing directly on the workpiece. The ram also supports adjustable controls for the vertical movement of the quill, including a slide 200 mounted for vertical movement on the ram and carrying a rack 201 meshing with pinion teeth on a shaft 202 extending to the left hand side of the ram and provided with a handwheel 205 and a graduated scale dial 206.

More accurate adjustment of the quill is provided for by a worm gear 210 mounted for free rotation on the inner end of shaft 202 and meshing with a worm 211 on a shaft 212 extending to the front of the ram and provided with a handwheel 213 and vernier scale dial 214. The worm gear 210 is shown as releasably connected with shaft 202 by a spring loaded locking pin 215 carried by a bushing 216 set in a wheel 217 splined on the right hand end of shaft 202. The pin 215 is arranged to engage in one of a series of bores in the side of gear 210 in a manner similar to the worm wheel 125, and the pin 215 can be retracted from its locked position and turned by means of its knob 220 to a position where a cross pin 222 latches in the outer end of its supporting bushing 216.

All of the above operations can be carried out by manual control of the machine by the several handwheels as described, and the drawings also show the machine as provided with a power drive transmission for power operation requiring manual control only of the separate clutches for each drive motion. Referring to Figs. 1–3, a motor 230 is mounted at the back end of the ram and includes an electric brake 231. Motor 230 drives a variable speed transmission 232, shown as a Graham variable speed transmission, and adjustment of transmission 232 is shown as effected by a handwheel 235 at the back end of the ram and alternatively by a similar handwheel 236 mounted at the front end of the ram and operating through a flexible shaft 237. The transmission 232 in turn drives a power shaft 240 which extends to the front end of the ram and into the gear box 242, the connection between the transmission and shaft 240 being shown as including a flexible coupling 245 and a worm set 246.

Referring to Fig. 17, the power shaft 240 carries a drive gear 250 and a second drive gear 251 which operates in combination with an idler gear 252 on shaft 240 to provide a reverse drive. The gear 250 meshes with a gear 255 on the rotary table drive shaft 45 and also with a gear 256 on the Y-direction drive shaft 167, and gear 255 also meshes with a gear 257 on X-direction drive shaft 127 which in turn meshes with a gear 258 on quill adjusting shaft 212. Since the shafts 45, 127 and 240 are arranged in equispaced relation as shown in Fig. 1, gear 255 is approximately twice the thickness of gears 250 and 257, and the latter are correspondingly axially offset as shown. The drive gear 251 meshes with a gear 260 on X-drive shaft 127 which in turn meshes with gear 261 on quill shaft 212 and also with a gear 262 on rotary table shaft 45 to drive gear 262 in the opposite direction from the other gear 255 on shaft 45. Gear 262 meshes with idler 252 which in turn meshes with a gear 265 on Y-drive shaft 167 to complete the reverse drive chain.

All of the several gears 255—265 are free on their respective shafts, and individually operable clutches having forward, reverse and neutral positions are provided for each shaft. Referring to Figs. 17 and 18 a dog clutch member 270 is splined on Y-drive shaft 167 in gear box 242 and is shiftable from its neutral position shown in Fig. 18 into engagement with the complementary clutch teeth on gear 256 or the similar teeth on gear 265. Shifting of clutch member 270 is effected by a cam 271 on cam shaft 272 which carries a wear shoe 273 riding in a circumferential slot 274 in clutch member 270. The cam shaft 272 is provided with an operating handle 275 and is shown as releasably held in each of its selected positions by a spring loaded detent plunger 276 mounted in the wall of the gear box and cooperating with a corresponding plurality of grooves 277 in the side of cam shaft 272. The handle 275 may also serve as a cam for operating the limit switch 278 as indicated in Figs. 2 and 19, the switch 278 being normally open when the clutch is disengaged and being closed by handle 275 when it is shifted to either of the engaged positions of clutch member 270.

There is a corresponding clutch member 280 on X-drive shaft 127 operated by a cam unit and handle indicated generally at 281 (Fig. 2) and provided with a limit switch 282. The similar clutch member 285 on quill drive 212 has an operating handle 286 and a projection 287 on handle 286 is arranged in the path of adjustable stop pins 288 and 289 on quill slide 200 so that when the slide reaches the desired upper or lower limit position under power operation, the corresponding stop pin will engage projection 287, and cam clutch handle 286 to its neutral position. The clutch member 290 on rotary table shaft 45 is shown as provided with an operating arm 291 connected to a sleeve 292 on a shaft 293 running the full length of the ram and provided at its opposite ends with handles 294 and 295. The shaft 293 carries a pin 296 riding in a spiral slot 297 in sleeve 292 to cause axial movement of the sleeve and resulting shifting movement of clutch member 290 by arm 291 when shaft 293 is rocked by either of its operating handles. The limit switch 298 for this clutch member is indicated as operated by the handle 295 at the back end of the ram.

It will be apparent that with this transmission assembly, the power shaft 240 can be operated continuously, and the several clutches can be engaged and disengaged as desired in accordance with the particular work operations to be performed, as described in more detail hereinafter in connection with the wiring diagram and Figs. 19–21. It will also be apparent that a power drive could be provided for the lead screw 55, as shown for example in my above noted copending application, but the manually operated arrangement shown in the drawings is generally satisfactory, particularly for machines of such sizes that the effective length of the lead screw is of the comparatively small range indicated.

In the wiring diagram (Fig. 19), a main switch 300 controls the A. C. power lines 301 and 302 and supplies alternating current to the rectifier 303, which in turn provides direct current for operation of magnet 66. A signal light 304 may be provided as shown to indicate when switch 300 is closed. A manual switch 305 controls the connection for the spindle drive motor 36, and a similar manual switch 306 controls the feed motor 230 through the normally closed upper two pairs of contacts of a relay $R_1$ which forms part of the safety circuit. The brake 231 for motor 230 is similarly operated through the normally open back pairs of contacts of relay $R_1$ when the relay is energized.

The energizing circuit for the operating coil 310 of relay $R_1$ runs through the limit switches 157 and 187, which are normally closed and connected in parallel, through the limit switches 278, 282, and 298, which are similarly connected in parallel, and through an indicating light 311 in a line 312 to one of the limit switches 81 on magnet 66, and a line 313 leads from switch 81 to the other side of the main line through feed switch 306. A line 314 by-passes the several limit switches 157, 187, 278, 282 and 298 to energize light 311 when limit switch 81 is closed and thus to show that the magnet is energized irrespective of the condition of the other limit switches. A parallel energizing circuit for safety relay coil 310 is provided through two normally open limit switches 315 and 316 connected in parallel. The limit switch 316 is shown as mounted on the saddle 25 for operation by stops 317 and 318 on the ram at the limits of the movements of the ram in the Y-direction established by the dimensions of the machine, and the switch 315 may be similarly mounted on the base and operated by stops on the saddle at the limits of its movements in the X-direction.

The magnet 66 is energized through two normally open sets of contacts of a relay $R_2$ having its operating coil 320 initially energized through a normally open push button switch 321 which is effectively the magnet engaging switch and is closed to set the machine for arcuate or oblique movement of the ram. Closing of switch 321 also completes a holding circuit for coil 320 through a pair of normally open contacts 322 in relay $R_2$ and the normally closed contacts of a relay $R_3$ having its operating coil 323 connected through the normally closed limit switches 158 and 188. Switch 321 similarly controls the operating coil 325 of a relay $R_4$ having one pair of normally open contacts controlling the operating coil 326 of the solenoid 155. A holding circuit for coil 325 runs through the other pair of contacts of relay $R_4$ and through a normally closed push button switch 327 which acts as the magnet releasing switch and is opened following an arcuate stroke preparatory to resetting or movement of the ram in the X- or Y-direction.

In operation with the machine wired as shown, closing of switch 300 supplies power to the rectifier 303 and also to the switches 305 and 306 controlling the spindle motor and feed motor respectively. Closing of switch 306 will in turn start the feed motor 230, which will operate so long as the relay $R_1$ remains deenergized. If magnet 66 remains released, motor 230 may be employed for resetting by rotation of the rotary table, for either resetting or a work operation by movement of the ram in either the X- or Y-direction, and for adjusting the quill. Any one or more of these drives can be selectively connected with the motor by operation of their respective clutches as described, and in the event of overtravel in either the X- or Y-direction, the corresponding switch 315 and 316 will close to energize relay $R_1$ and thus stop motor 230 and apply brake 231. Also, the infinity radius mechanism can be adjusted either by hand or power, namely by locking guide 50 to the ram and then driving the rotary table.

In order to execute an arcuate or oblique working stroke, magnet 66 is energized by closing switch 321 to energize relays $R_2$ and $R_4$ and also to complete their respective holding circuits as described. At the same time, solenoid valve 155 will be energized to operate the hydraulic cylinders 153 and 186 and thereby to shift the levers 150 and 185 in the directions to disengage the clutch pins 136 and 176 of the X- and Y-drives at the respective handwheels 123 and 163. In order to assure clamping of the magnet before these clutch connections are released, a throttling valve may be incorporated in the pressure lines to the cylinders 153 and 186, as indicated at 330, to provide a time delay in the release of their associated clutches.

This movement of the levers 150 and 185 opens the switches 157 and 187 to prevent operation of the safety relay $R_1$, but the indicator light 311 will be energized through limit switch 81 and the lines 313 and 314. Similarly the movement of the levers 150 and 185 will cause switches 158 and 188 to open and thereby to interrupt the energizing circuit for coil 323 of the relay R₃ controlling the holding circuit for coil 320 of relay R₂. With the circuits thus established the power feed can be employed as desired to operate the ram through the rotary table clutch member 290 as described, and the quill clutch member 280 can also be engaged as desired and does not require connection with the safety circuit. On the other hand, the X- and Y-drives cannot be connected by reason of the disengagement of their clutch pins by levers 150 and 185, and if either of the latter clutch pins should accidentally engage, the associated switch 157 or 187 will close and thereby cause immediate energizing of relay R₁ to stop the feed motor and apply the brake. Similarly if magnet 66 should accidentally release, the operator will immediately be informed of that fact by failure of light 311.

When the working stroke has been completed and it is desired to release magnet 66 for resetting, switch 327 is opened. This breaks the holding circuit for relay R₄, and the resulting deenergizing of this relay shifts solenoid valve 155 to cut off the pressure supply to the hydraulic cylinders 153 and 186 and to connect these cylinders to drain. The action of the return springs in these cylinders and the springs 139 and 179 will move the levers 150 and 185 back to their rest positions and thereby enable reengagement of the clutch connections of the X- and Y-drives.

When the levers 150 and 185 have completed their movements, they will close the switches 158 and 188 and thereby complete the energizing circuit for relay R₃, and this in turn will break the holding circuit for relay R₂ and thus break the energizing circuit to magnet 66. Before the magnet releases, however, the limit switch 80 will remain closed and will operate through the resistor 333 to reverse the magnetic flux to the magnet and thereby to permit the magnet to be lifted promptly by the action of spring 77 as described. This operation provides a time delay assuring engagement of the X- and Y-drive clutch pins before the magnet is released to prevent undesired movement of the ram. It will also be noted that both of these clutch connections must be closed before the magnet can release, which may require rotation of one or both of the handwheels 130 and 170 to engage the associated clutch pins 136 and 176 as described.

It will be apparent that the major components of the electrical system can be located at any convenient position on or adjacent the machine, and Fig. 1 shows a control box 335 mounted on the left side of the base which represents a housing for portions of the electrical controls having the main switch handle 300 on the outside thereof. The switches 305, 306, 321 and 327 may be similarly located in the control housing 335, but for convenience of operation it may be found preferable to mount some or all of them in or on a control box 340 at the front end of the ram adjacent the several handwheels as shown in Figs. 1–3.

Figs. 20–22 illustrate the operation of the machine in generating an arc of a five-inch radius having a chord length of 4 inches and with the starting tangent to this arc extending in the X-direction, and in these views the outline 350 represents an arbitrary square section of the ram 30 which illustrates the translational movement of the entire ram. With $k$ equal to 4 as described, then in accordance with Equation 2 above, $$\operatorname{cosec} \alpha = 5/2 = 2.500 \qquad (5)$$
$$\alpha = 23.58° \qquad (6)$$

and it is accordingly first necessary to set the infinity radius mechanism to the proper angle $\alpha$ and also to adjust the machine to generate the arc in the desired direction. The several steps required to set and operate the machine are as follows:

(1) With the pivot blocks 51 and 53 in their zero position and magnet 66 released, rotate the rotary table 40 to a position wherein the arrows 115 and 116 point generally in the direction of the tangent to the starting point of the arc. In this example, these arrows should point in the X-direction, and Fig. 3 shows the parts in this adjusted position.

(2) Lock pin 99 in the nearest bore 105 in the ram, thereby locking guide 50 to the ram. The guides may if necessary be rotated manually in this step if pin 99 is not initially in line with a bore 105.

(3) Release the clamp 90—95 to permit relative movement of guides 50 and 52.

(4) Rotate table 40 to shift guide 52 through the proper angle $\alpha$ with respect to guide 50 and in the direction such that the large arrow 115 leads off in the general direction of the arc with respect to the direction of the starting tangent indicated by small arrow 116. This movement may be through power operation, by engagement of clutch member 290, or by manual rotation of handwheel 46 or 46′, and the proper angle for this movement may be measured either in degrees by scale 47 or by a scale 355 (Fig. 15) on the outer surface of the part 90 which cooperates with a pointer 356 on the clamp portion 92 of guide 52. The scale 355 is graduated to read directly in terms of the radius of the arc to be generated and is so arranged that the zero mark on scale 355 coincides with pointer 356 when the guides are in direct line.

(5) Reclamp the clamp mechanism 90—95 to hold guides 50 and 52 in their adjusted position.

(6) Shift pin 99 to its neutral position to permit movement of the guides with respect to the ram.

(7) If necessary, rotate table 40 until the small arrow 116 points accurately in the direction of the tangent to the starting point of the arc. In this example, this step is not necessary if step 1 was carried out with the proper accuracy, and Fig. 20 shows the parts in this adjusted position.

(8) Press switch 321 to effect clamping of the magnet 66 and release of clutch pins 136 and 186.

(9) Operate lead screw 55 through a distance equal to the chord of the arc to be generated, namely 4 inches as measured by either of scale 57 or 110. Fig. 21 shows the relative positioning of the parts at an intermediate stage of this step, and Fig. 22 shows the parts following completion of the step.

During step 9, the magnet 66 remains fixed, with its axis being initially in line with the pivot pin 60, and it remains in line with the pivot stud 61 indicated in Fig. 21 throughout this step. The pivot block guides 50 and 52 therefore move only rotationally on the axis of pivot stud 61, but the pivot blocks 51 and 53 move both rotationally, with the guides 50 and 52, and also linearly with relation to their respective guides 50 and 52 in directions which are inclined with respect to each other in accordance with the relative angular setting of the two guides. This combination of movements causes pivot stud 60 to follow an arcuate path having the desired radius, chord length and direction, for the reasons explained in detail in my above patent. All other parts of the ram will accordingly follow a similar path.

In connection with step 9, the maximum chord length for a single stroke is equal to the maximum single stroke of lead screw 55, namely 4½ inches with the machine of the proportions indicated. For arcs of greater chord length, resetting is necessary after the first stroke, which requires the following additional steps.

(I) Operate switch 327 to release magnet 66 and reengage the clutch pins in the X- and Y-drives.

(II) Operate lead screw 55 through the distance required to return the scales 57 and 110 to zero.

(III) Rotate table 40 through an angle equal to the number of degrees of the arc generated during the first stroke. This step is simplest if the first stroke is terminated upon the completion of a chord equal in length to the distance $k$, since the required angular adjustment of the table will then be exactly equal to twice the angle $\alpha$. Similarly if the total added chord length of the arc to be cut is greater than $2k$, it is preferable to operate in successive strokes each equal to $k$ in chord length.

(IV) Repeat step 8 to reengage the magnet.

(V) Repeat step 9 as required to complete the arc.

In Figs. 21 and 22, the dotted arcs 360 show the translational movement of the ram along the desired arcuate path, and since every point on the ram follows an identical path, it will be understood that the spindle and tool will follow this path with respect to the work table. Similarly, and for the same reasons, if multiple spindles are provided on the ram, they will generate separate identical profiles. Fig. 22 also indicates a possible continuation of the movement of the ram to generate a profile in which the arc 360 is followed by a straight line 361 which is 6 inches in length and which is arranged at 45° to the X- and Y-directions and which in turn is followed by a 90° arc 362 of a 2-inch radius having its starting tangent extending in the X-direction. In order to carry out these strokes following completion of step 9 above, the following steps are necessary.

(10) Operate switch 327 to release the magnet.

(11) Return guides 50 and 52 to their aligned position, and lock them by means of pin 99. This step may be effected manually or by means of the rotary table in effectively the opposite manner from steps 2 to 5 above.

(12) Return pivot blocks 51 and 53 to their zero position, this step being interchangeable with step 11.

(13) Rotate table 40 until arrows 115 and 116 point in the desired 45° direction to the X- and Y-axes.

(14) Repeat step 8 to reengage the magnet.

(15) Operate lead screw 55 in its maximum extent.

(16) Repeat step 10.

(17) Repeat step 12.

(18) Repeat step 8.

(19) Operate lead screw 55 through 1½ inches to complete the straight line 361.

(20) Repeat step 10.

(21) Rotate table 40 until the pointers 112 lie in the X-direction and the arrows 115 and 116 point towards the front of the machine, namely with these arrows lying in the direction of the starting radius of an arc about the pivot 60.

(22) Operate lead screw 55 to a setting of 2 inches on scale 57 or 110.

(23) Repeat step 8.

(24) Rotate table 40 in counterclockwise direction through 90° as measured on scale 47 or scale 111.

Additional portions of the profile may be similarly generated as required, and it should be noted that all such operations may be carried out without withdrawing the tool from the work and without unproductive movement of the tool. Furthermore, if the straight line 361 is aligned with either the X- or Y-direction, it could be generated by employing the corresponding X- or Y-drive following step 10 and without requiring any of steps 15 to 20. In addition, while such X- or Y-movement is in progress, the operator can perform steps 17 to 22 without interfering with the operation of the machine in the X- or Y-direction, and thus resetting for arc 362 will already have been accomplished upon completion of the straight line 361 so that only steps 23 and 24 remain.

When the machine is power operated, it will be apparent that for a given setting of the variable speed transmission 232, the feed speed in the X- and Y-direction will be constant under power operation. Similarly the angular speed of the rotary table will be constant, but the feeding speed of the spindle for small radius arcs will vary depending upon the radius of a given such arc, from zero for an arc of zero radius to a maximum for the arc of the maximum small radius.

If it is desired to match the feed speed for arcs of small radius with the X- and Y-direction feed speeds, this may be done with reasonable accuracy by appropriate adjustment of the transmission 232, as will be readily understood. Such adjustment is facilitated if the gearing for the machine is initially so calculated that for any given X and Y speed, the same speed will be automatically established for an arc of a radius in approximately the middle of the total small radius range. Then for other small radius arcs, the transmission speed should be increased as the radius decreases below this chosen radius and should be correspondingly reduced as the radius increases. If the lead screw 55 is power operated, the drive thereto can be readily coordinated with the X- and Y-drives to provide essentially matched speeds, and with this lead screw manually operated as shown, the skill of the operator can be relied upon to establish the proper speed.

It will accordingly be apparent that the present invention provides a simple and at the same time rugged construction of machine tool having many practical advantages from the standpoint of both versatility and simplicity of operation and maintenance. It will also be apparent that the invention is not limited to machine tools such as the milling machine described, particularly since the illustrated machine may be very simply converted to other purposes such as scribing or grinding by merely selecting an appropriate scribing or grinding tool in place of a milling cutter. In addition, the illustrated machine may be adapted for many other purposes in substantially the manner shown in my above noted copending application, including surface grinding, shaping, flame cutting and the like, and for all such purposes the invention provides essentially the same practical advantages of economy and convenient and reliable operation.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a machine tool of the character described including a main base, the combination of a ram, means for supporting a working member and a work table one on said base and the other on said ram, a saddle, guide means connecting said saddle with said ram and said base for movement limited to respectively perpendicular index directions and cooperating with said saddle to mount said ram for translational movement with respect to said base, a rotary table supported by said ram for translational movement therewith and for rotation with respect thereto, a pair of guides on said rotary table having a pivotal connection for relative angular adjustment, guided members in said guides having separate pivotal connections to said rotary table, means for releasably clamping one said guide with respect to said base, and drive means for causing movement of said guided members in said guides to cause said ram to move translationally along an arc of a radius determined by the angular relationship of said guides.

2. In a machine tool of the character described including a main base, the combination of a ram, means for supporting a working member and a work table one on said base and the other on said ram, a saddle, guide means connecting said saddle with said ram and said base for movement limited to respectively perpendicular index directions and cooperating with said saddle to mount said ram for translational movement with respect to said base, a rotary table supported by said ram for translational movement therewith and for rotation with respect thereto, a pair of guides on said rotary table having a pivotal connection for relative angular adjustment, guided members in said guides having separate pivotal connections to said rotary table, means for releasably clamping one said guide with respect to said base while providing for pivotal movement of said one guide with respect to said base coaxially with said pivotal connection of said guides, linear drive means for causing movement of said guided members in said guides to cause said ram to move translationally along an arc of a radius determined by the angular relationship of said guides, and rotary drive means for rotating said rotary table and said guides to determine the direction of said arcuate movement with respect to said index directions.

3. In a machine tool of the character described including a main base, the combination of a ram, means for supporting a working member and a work table one on said base and the other on said ram, a saddle, guide means connecting said saddle with said ram and said base for movement limited to respectively perpendicular index directions and cooperating with said saddle to mount said ram for translational movement with respect to said base, a rotary table supported by said ram for translational movement therewith and for rotation with respect thereto, a pair of guides on said rotary table having a pivotal connection for relative angular adjustment, guided members in said guides having separate pivotal connections to said rotary table, means for releasably clamping one said guide with respect to said base, linear drive means for causing movement of said guided members in said guides to cause said ram to move translationally along an arc of a radius determined by the angular relationship of said guides, means limiting said angular adjustability of said guides to a predetermined angular range providing a finite minimum radius for said arcuate movement of said ram, and rotary drive means for said rotary table cooperating with said guides and guided members to cause translational movement of said ram along an arc of a selected radius in the range from zero to said minimum radius.

4. In a machine tool of the character described including a main base, the combination of a ram, means for supporting a working member and a work table one on said base and the other on said ram, a saddle, guide means connecting said saddle with said ram and said base for movement limited to respectively perpendicular index directions and cooperating with said saddle to mount said ram for translational movement with respect to said base, a rotary table supported by said ram for translational movement therewith and for rotation with respect thereto, a pair of guides on said rotary table having a pivotal connection for relative angular adjustment, guided members in said guides having separate pivotal connections to said rotary table, means for releasably clamping one said guide with respect to said base, drive means for causing movement of said guided members in said guides to cause said ram to move translationally along an arc of a radius determined by the angular relationship of said guides, and selectively operable additional drive means for driving said ram with respect to said saddle in one of said index directions and for driving said saddle with respect to said base in the other said index direction.

5. In a machine tool of the character described including a main base, the combination of a ram, means for supporting a working member and a work table one on said base and the other on said ram, a saddle, guide means connecting said saddle with said ram and said base for movement limited to respectively perpendicular index directions and cooperating with said saddle to mount said ram for translational movement with respect to said base, a rotary table supported by said ram for translational movement therewith and for rotation with respect thereto, a pair of guides on said rotary table having a pivotal connection for relative angular adjustment, guided members in said guides having separate pivotal connections to said rotary table, means for releasably clamping one said guide with respect to said base, drive means for causing movement of said guided members in said guides to cause said ram to move translationally along an arc of a radius determined by the angular relationship of said guides, selectively operable additional drive means for driving said ram with respect to said saddle in one of said index directions and for driving said saddle with respect to said base in the other said index direction, and means coordinated with said clamping means for releasably locking said additional drive means substantially simultaneously with the release of said clamping means to prevent undesired movement of said ram while said clamping means are released.

6. In a machine tool of the character described including a main base, the combination of a ram, means for supporting a working member and a work table one on said base and the other on said ram, a saddle, guide means connecting said saddle with said ram and said base for movement limited to respectively perpendicular index directions and cooperating with said saddle to mount said ram for translational movement with respect to said base, a rotary table supported by said ram for translational movement therewith and for rotation with respect thereto, a pair of guides on said rotary table having a pivotal connection for relative angular adjustment, guided members in said guides having separate pivotal connections to said rotary table, means for releasably clamping one said guide with respect to said base, main drive means for causing movement of said guided members in said guides to cause said ram to move translationally along an arc of a radius determined by the angular relationship of said guides, selectively operable additional drive means for driving said ram with respect to said saddle in one of said index directions and for driving said saddle with respect to said base in the other said index direction, and indicating means operated by said additional drive means for indicating the position of said ram with respect to said index directions during operation of said main drive means.

7. In a machine tool of the character described including a main base, the combination of a ram, means mounting said ram for translational movement with respect to said base, a rotary table supported by said ram for translational movement therewith and for rotation with respect thereto, a pair of guides on said rotary table having a pivotal connection for relative angular adjustment, guided members in said guides having separate pivotal connections to said rotary table, means for releasably clamping one said guide with respect to said base, drive means for causing movement of said guided members in said guides to cause said ram to move translationally along an arc of a radius determined by the angular relationship of said guides, a pair of additional drive means for driving said ram selectively in one or the other of two relatively perpendicular index directions, each said additional drive means including a self-locking worm drive preventing movement of said ram except upon operation of said additional drive means, each said additional drive means also including a releasable driving connection between said worm drive therein and said ram, and means coordinated with said clamping means for causing release of said clamping means upon engagement of said connections and for causing release of said connections upon engagement of said clamping means.

8. In a machine tool of the character described including a main base, the combination of a ram, means mounting said ram for translational movement with respect to said base, a rotary table supported by said ram for translational movement therewith and for rotation with respect thereto, a pair of guides on said rotary table having a pivotal connection for relative angular adjustment, guided members in said guides having separate pivotal connections to said rotary table, means for releasably clamping one said guide with respect to said base, main drive means for causing movement of said guided members in said guides to cause said ram to move translationally along an arc of a radius determined by the angular relationship of said guides, a pair of additional drive means for driving said ram selectively in one or the other of two relatively perpendicular index directions, each said additional drive means including a self-locking worm drive and a releasable driving connection between said worm drive therein and said ram, means coordinated with said clamping means for causing release of said clamping means upon engagement of said connections and for causing release of said connections upon engagement of said clamping means, separate means connected in each said additional drive means between said connection therein and said ram for indicating the position of said ram with respect to the associated said index direction during operation of said main drive means, said indicating means and said connection being coordinated to provide for engagement of said connection only in positions of said indicating means corresponding to predetermining relatively large increments of measure of the movement of said ram, and additional indicating means operating through said worm drive in each said additional drive means for measuring shifting movement of said connection to a position of engagement thereof following movement of said ram to measure said movement of said ram in predetermined smaller increments.

9. In a machine tool of the character described including a main base, the combination of a ram, means for supporting a working member and a work table one on said base and the other on said ram, a saddle, guide means connecting said saddle with said ram and said base for movement limited to respectively perpendicular index directions and cooperating with said saddle to mount said ram for translational movement with respect to said base, a rotary table supported by said ram for translational movement therewith and for rotation with respect thereto, a pair of guides on said rotary table having a pivotal connection for relative angular adjustment, guided members in said guides having separate pivotal connections to said rotary table, means for releasably clamping one said guide with respect to said base while providing for pivotal movement of said one guide with respect to said base coaxially with said pivotal connection of said guides, linear drive means for causing movement of said guided members in said guides to cause said ram to move translationally along an arc of a radius determined by the angular relationship of said guides, rotary drive means for rotating said rotary table and said guides to determine the direction of said arcuate movement with respect to said index directions, and means for releasably locking one said guide to said ram and for causing the other said guide to move with said rotary table upon rotation thereof to effect said angular adjustment of said guides.

10. In a machine tool of the character described including a main base, the combination of a ram, means for supporting a working member and a work table one on said base and the other on said ram, a saddle, guide means connecting said saddle with said ram and said base for movement limited to respectively perpendicular index directions and cooperating with said saddle to mount said ram for translational movement with respect to said base, a rotary table supported by said ram for translational movement therewith and for rotation with respect thereto, a pair of guides on said rotary table having a pivotal connection for relative angular adjustment, guided members in said guides having separate pivotal connections to said rotary table, means for releasably clamping one said guide with respect to said base while providing for pivotal movement of said one guide with respect to said base coaxially with said pivotal connection of said guides, rotary drive means for causing movement of said guided members in said guides to cause said ram to move translationally along an arc of a radius determinded by the angular relationship of said guides, rotary drive means for rotating said rotary table and said guides to determine the direction of said arcuate movement with respect to said index directions, means supporting both said drive means on said ram for movement therewith, and manual controls for said drive means mounted on said ram in exposed positions for ready actuation by the operator.

11. In a machine tool of the character described including a main base, the combination of a ram, means mounting said ram for translational movement with respect to said base, a rotary table supported by said ram for translational movement therewith and for rotation with respect thereto, a pair of guides on said rotary table having a pivotal connection for relative angular adjustment, guided members in said guides having separate pivotal connections to said rotary table, means for releasably clamping one said guide with respect to said base, main drive means for causing movement of said guided members in said guides to cause said ram to move translationally along an arc of a radius determined by the angular relationship of said guides, a pair of additional drive means for driving said ram selectively in one or the other of two relatively perpendicular index directions, means supporting all said drive means on said ram for movement therewith, and manual controls for said drive means mounted on said ram in exposed positions for ready actuation by the operator.

12. In a machine tool of the character described including a main base, the combination of a ram, means mounting said ram for translational movement with respect to said base, a rotary table supported by said ram for translational movement therewith and for rotation with respect thereto, a pair of guides on said rotary table having a pivotal connection for relative angular adjustment, guided members in said guides having separate pivotal connections to said rotary table, means for releasably clamping one said guide with respect to said base, main drive means for causing movement of said guided members in said guides to cause said ram to move translationally along an arc of a radius determined by the angular relationship of said guides, a pair of additional drive means for driving said ram selectively in one or the other of two relatively perpendicular index directions, means supporting all said drive means on said ram for movement therewith, manual controls for said drive means mounted on said ram in exposed positions for ready actuation by the operator, a power operated drive source mounted on said ram, and means on said ram for connecting selected said drive means with said drive source for power operation.

13. In a machine tool of the character described including a main base, the combination of a ram, means for supporting a working member and a work table one on said base and the other on said ram, a saddle, means connecting said saddle with said ram and said base for movement limited to respectively perpendicular index directions and cooperating with said saddle to mount said ram for translational movement on said base, a rotary table journaled on said ram, a guide supported on said table for movement with respect thereto in a plane parallel with said index directions, a clamp pivoted on said guide and movable therewith into and out of coaxial relation with the rotational axis of said rotary table, a guided member cooperating with said guide, means for securing said guided member to said rotary table, means for clamping and unclamping said clamp with respect to said base, linear drive means for moving said guide with respect to said guided member to cause said guide to drive said ram linearly through said guided member and said rotary table when said clamp is clamped and alternatively to cause resetting movement of said guide with respect to said ram and said base when said clamp is unclamped, rotary drive means for rotating said rotary table on said ram to determine the direction of said linear movement of said ram and also to cause rotational movement of said ram in an arc of a radius determined by the relative positions of the pivotal axis of said clamp and said rotational axis of said rotary table, selectively operable additional drive means for driving said ram with respect to said saddle in one of said index directions and for driving said saddle with respect to said base in the other said index direction, and means coordinated with said clamping means for releasably locking said additional drive means substantially simultaneously with the unclamping of said clamp to hold said ram stationary during said resetting movement of said guide.

14. In a machine tool of the character described including a main base, the combination of a ram, means for supporting a working member and a work table one on said base and the other on said ram, a saddle, means connecting said saddle with said ram and said base for movement limited to respectively perpendicular index directions and cooperating with said saddle to mount said ram for translational movement on said base, a rotary table journaled on said ram, a guide supported on said table for movement with respect thereto in a plane parallel with said index directions, a clamp pivoted on said guide and movable therewith into and out of coaxial relation with the rotational axis of said rotary table, a guided member cooperating with said guide, means for securing said guided member to said rotary table, means for clamping and unclamping said clamp with respect to said base, linear drive means for moving said guide with respect to said guided member to cause said guide to drive said ram linearly through said guided member and said rotary table when said clamp is clamped and alternatively to cause resetting movement of said guide with respect to said ram and said base when said clamp is unclamped, rotary drive means for rotating said rotary table on said ram to determine the direction of said linear movement of said ram and also to cause rotational movement of said ram in an arc of a radius determined by the relative positions of the pivotal axis of said clamp and said rotational axis of said rotary table, selectively operable additional drive means for driving said ram with respect to said saddle in one of said index directions and for driving said saddle with respect to said base in the other said index direction, and indicating means operated by said additional drive means for indicating the position of said ram with respect to said index directions during operation of the other said drive means.

References Cited in the file of this patent

UNITED STATES PATENTS

| | | |
|---|---|---|
| 1,689,370 | Tessky | Oct. 30, 1928 |
| 2,610,550 | Touchman | Sept. 16, 1952 |